Sept. 25, 1928.

A. SCHREIER 1,685,204

LIQUID TREATING MATERIAL AND METHOD OF MAKING SAME

Filed Nov. 3, 1921

Witness:
P. Burkhardt

Inventor:
Arthur Schreier,
By Cromwell, Greist & Warden
Attys.

Patented Sept. 25, 1928.

1,685,204

UNITED STATES PATENT OFFICE.

ARTHUR SCHREIER, OF VIENNA, AUSTRIA, ASSIGNOR, BY MESNE ASSIGNMENTS, TO GENERAL ZEOLITE COMPANY, OF CHICAGO, ILLINOIS, A CORPORATION OF ILLINOIS.

LIQUID-TREATING MATERIAL AND METHOD OF MAKING SAME.

Application filed November 3, 1921, Serial No. 512,688, and in Austria October 8, 1920.

This invention relates generally to the arts of sterilizing and filtering. More particularly, the invention has to do with a new filtering and sterilizing material, and a process for preparing or treating filtering or sterilizing material.

The general purpose of the present invention is the provision of a material especially adapted for the treatment of fluids to render them sterile,—that is, to kill or disable micro-organisms which may be contained or carried in the fluids, or to retard or inhibit their biological functioning.

A further particular object of the invention is the provision of a sterilizing medium adapted particularly for the treatment of liquids to render them sterile, without in any way unfitting them for consumption or undesirably influencing their taste, appearance, odor, or other desirable characteristics.

A further specific object of the invention is the provision of a sterilizing material adapted for the treatment of fluids, which is adapted to be cleaned or washed of deposits or accretions which might tend to lower its effectiveness.

In the practice of sterilization, particularly the sterilization of fluids, there are two general classes of treatment,—one being treatment by heat, and the other being treatment by chemical dosage. The first involves the application of heat to the material which it is desired to sterilize, and the latter involves the application of additional materials, either in gaseous, liquid or solid form, to the treated material. All of such treatments require attentive supervision for the regulation or apportioning of the applied agencies, and all involve the possibility of deleteriously affecting the treated material if it is of organic nature and particularly if it is of a kind designed for consumption as food or drink. In the treatment of liquids, such sterilizing processes are frequently supplemented by filtration, which is a mechanical operation consisting essentially of straining out of the liquid the bodies which it is desired to remove. Filtering is accomplished by passing the liquid through a medium of a kind adapted to permit passage of the liquid and retain the suspended bodies, such medium variously taking the forms of solid or integral porous bodies, such as stones, porous integral fibrous bodies, such as sieves, mats, filter paper and the like, or non-integral porous bodies, such as sand beds, gravel beds, fiber beds, or the like. The action of such media, as stated above is entirely mechanical and depends for its effectiveness on difference of size between the molecules of the fluid and the bodies which it is desired to separate out of the fluid. Due to the minute size of various micro-organisms, their removal from liquid by filtration is impossible.

In the drawings, forming a part of this specification,

Figure 1:
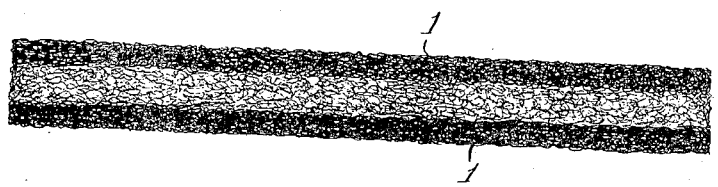
Fig. 1 is a diagrammatic illustration of a sterilizing material in the nature of a filter mat or porous slabs.

The process constituting my invention may be described generally as the production of a new sterilizing medium or article by the treatment of a suitable foundation material with a solution or emulsion of a metal in such fashion as to cause a reduction or precipitation of the metal on the foundation material. As a specific illustration of the process, take a suitable foundation material which is adapted to the intended use, as a filter mat, filter stone, filter candle, or a quantity of clean filter sand, and drench it with a solution of silver, such as silver nitrate, or a solution of a silver salt or haloid. The material thus treated is then exposed to light until a brown or black coloring, in the case of silver nitrate, is noticeable, resulting from the production of metallic silver on the parts of the foundation material to which the solution has access. For the strength of such silver nitrate solution, I have found one of about five percent to give good results, but it makes relatively little difference if a solution somewhat weaker or somewhat stronger is employed. The manner in which the solution is applied to the foundation material may vary according to the nature of the material and the nature of the result desired. Granular or comminuted material, such as sand, may be immersed in the solution and the particles surface-coated by stirring. Integral foundation materials, such as filter stones, filter mats, filter candles, and the like, may be surface-treated by painting them with the solution, or may be more thoroughly impregnated by soaking them in the solution or causing it to percolate through them. The extent of reduction may be controlled to some degree by the extent to which the articles are exposed to the light, so that a filter stone, for example, may be impregnated on one side or on both sides, or to any desired depth.

Another fashion in which the process may be practiced effectively is by treatment of the foundation material with the silver compounds utilized in photography, followed by development either with or without exposure to light, and then by fixing and washing operations to remove the unreduced silver and emulsion base. For such practice I prefer to use any of the gelatin emulsions of silver chloride or silver bromide such as are normally used in photography, particularly those suitable for wet plate photographic processes. Taking one of these well-known silver chloride or bromide gelatins, I dilute it three to eight times with distilled water, depending upon the nature of the foundation material to be treated, the more pervious materials requiring less dilution than the less pervious. This solution is applied to the foundation material as above described after which the impregnated or coated material, while still damp, is exposed to the light for a convenient effective period, and then immersed in a developing solution. In the developing solution, contrary to photographic practice, predominating quantities of acids or alkali are to be avoided, the developing solution being as near neutral as possible. The well-known developers, such as the iron oxalate (about 300 grams potassium oxalate, 25 grams sulphate of iron in 1 litre of water), glycin, hydrochinon or pyrogallol developers are applicable. After reduction to a desired degree by the developing treatment, the material may be given a fixing treatment as in photography, which consists in removing any undecomposed silver salts with sodium thiosulphate (1 part in 4 parts distilled water), while the gelatin of the original emulsion is removed by washing with hot water. The fixing material should be employed in a neutral solution, as distinguished from the acid or alkaline solutions ordinarily employed in photography, since the latter would harden the gelatin in the pores of the foundation material, rendering it insoluble. This is an important distinction from photographic practice which must be observed in the preparation of porous foundation material such as filter stones, mats, etc., as to both the developing and fixing operations, in order that the pores or surface of the material be not clogged by deposits of insoluble gelatin such as would interfere with the passage of fluid through the body.

The material prepared in this fashion is characterized by having its exterior surfaces, or the wall surfaces of its pores, covered with the metal reduced from the metallic salt or haloid carried in the original treating solution, and it has the capacity of destroying micro-organisms or of reducing, inhibiting or putting an end to their biological functioning when such organisms are brought into association with the material through suitable media. For example, bacilli contained in water or other liquid which has been passed through a body of this sterilizing material, or in contact therewith, will be killed or incapacitated, so that the liquid will be rendered sterile. Moreover, liquid which has been passed through or in contact with a body of this sterilizing material is given sterilizing capacity, and will incapacitate micro-organisms subjected to contact with it. In instances where the foundation material is a filter body or a filtering medium, therefore, it can be capacitated by the above process so as to constitute a medium having the dual function of both filtering and sterilizing a fluid passed through it.

Figure 2:
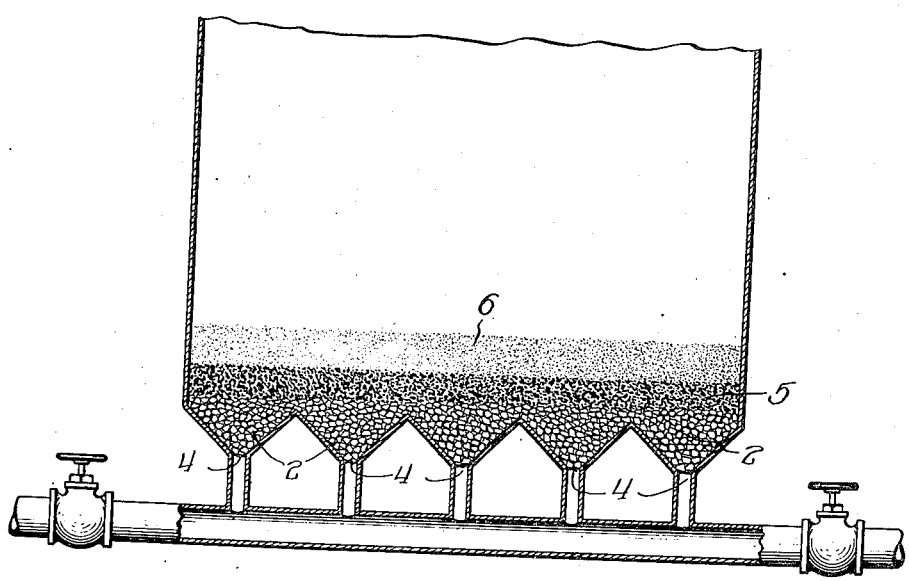
Fig. 2 is a diagrammatic illustration in the nature of a fragmentary vertical section through the lower part of a filter tank and filter bed, and illustrates another embodiment of my invention.

In the accompanying drawing, I have illustrated diagrammatically in Fig. 1 a body of porous material, such as a filter stone or filter mat, the portions 1 of the material adjacent the surfaces of the body being shaded to indicate that such portions carry deposit applied by my process. It is obvious that by means of my process such a body of filter material may be impregnated throughout its entire structure, or adjacent either one or both surfaces. In Fig. 2, I have illustrated diagrammatically a portion of a sand filter, the bed of which comprises the lower gravel strata 2 overlying the outlet openings 4, an intermediate stratum of granular material 5, and an upper stratum of granular material 6. The stratum 5 is intended to represent a bed of my new treating material in granular form, such as would be made by treating sand with the process above described. The granular material contained in the intermediate bed 5 is preferably of somewhat larger mesh than that contained in the superposed bed 6. In the operation of the filter, the top bed 6 exercises the mechanical function of catching the suspended matter in the liquid, so that the latter reaches the intermediate or treating bed 5 in a filtered or partly filtered condition. In its passage through the bed 5 the liquid is subjected to the action of the treating material of which that bed is constituted, and thereby sterilized, and at the same time filtered. Such filters are customarily cleaned by back-washing to remove the deposits of foreign material from the particles which make up the filter bed. By having the particles of which the bed 5 is comprised of somewhat larger size or of greater weight than that of the bed 6, the material will settle in the proper strata after back-washing, so that the body of treating material will be covered by the original upper stratum of filtering material. This arrangement tends to protect the treating material from accumulations of deposits on its surfaces which might tend to hinder its action upon the liquid passed through it.

What I claim is:—

1. A sterilizing material comprising a pervious foundation material with a surface deposit of silver, reduced to metallic form by photochemical action.

2. A sterilizing material comprising a porous material carrying a deposit of silver, reduced to metallic form by photochemical action.

3. A sterilizing medium comprising a carrier with a surface layer containing finely divided silver reduced to metallic form by photochemical action.

4. A sterilizing material comprising a carrier with a surface deposit of a sterilizing metal, reduced to metallic form from a light sensitive compound by photochemical action.

5. A process of making a sterilizing medium, which comprises depositing upon the surfaces of a carrier a light sensitive silver compound, and subjecting the deposit to photochemical action.

6. A process of forming a sterilizing medium, which comprises depositing upon a carrier a photographic emulsion containing a light sensitive silver salt, exposing to light, developing and removing the unaffected silver salt.

7. A process of preparing an active metal coating upon a porous material to be used in purification of fluids, which comprises depositing in and upon the porous material a light sensitive compound of the metal, exposing to light and producing the metal in situ.

In testimony whereof I have hereunto subscribed my name.

ARTHUR SCHREIER.